(12) United States Patent
Miura et al.

(10) Patent No.: US 7,023,686 B2
(45) Date of Patent: Apr. 4, 2006

(54) HIGH-VOLTAGE CERAMIC CAPACITOR

(75) Inventors: Iwao Miura, Tokyo (JP); Tsukasa Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/128,252

(22) Filed: May 13, 2005

(65) Prior Publication Data

US 2005/0259381 A1 Nov. 24, 2005

(30) Foreign Application Priority Data

May 20, 2004 (JP) ............................. 2004-150977

(51) Int. Cl.
*H01G 4/228* (2006.01)
(52) U.S. Cl. ............... 361/306.1; 361/321.2; 361/305
(58) Field of Classification Search ............... 361/303, 361/305, 306.3, 308.1, 309, 321.2, 321.3, 361/321.4, 306.1; 428/646–647
See application file for complete search history.

(56) References Cited

U.S. PATENT DOCUMENTS

| | | | | |
|---|---|---|---|---|
| 5,420,745 A | * | 5/1995 | Hidaka et al. | 361/306.1 |
| 6,180,264 B1 | * | 1/2001 | Takaoka et al. | 428/646 |
| 6,388,864 B1 | * | 5/2002 | Nakagawa et al. | 361/309 |
| 6,704,189 B1 | * | 3/2004 | Yoshii et al. | 361/308.1 |

FOREIGN PATENT DOCUMENTS

| | | |
|---|---|---|
| EP | 0 704 272 A1 | 4/1996 |
| EP | 0 9988 920 A1 | 3/2000 |
| EP | 1 080 824 A1 | 3/2001 |
| JP | 2001-334384 | 12/2001 |
| JP | 2002-198254 | 7/2002 |
| JP | 2002-224880 | 8/2002 |
| JP | 2002-261105 | 9/2002 |
| JP | 2003-051421 | 2/2003 |
| JP | 2003-243243 | 8/2003 |
| JP | 2003-326386 | 11/2003 |
| JP | 2004-025232 | 1/2004 |

* cited by examiner

*Primary Examiner*—Anthony Dinkins
(74) *Attorney, Agent, or Firm*—Oblon, Spivak, McClelland, Maier & Neustadt, P.C.

(57) ABSTRACT

A high-voltage ceramic capacitor which includes a capacitor element, at least one metal terminal, and at least one solder joint portion. The capacitor element has electrodes on opposing surfaces of a ceramic porcelain. The metal terminal has one end surface facing one surface of the electrode. The solder joint portion is interposed between one end surface of the metal terminal and one surface of the electrode, and solders both surfaces. The solder constituting the solder joint portion does not contain lead but inorganic particles having a melting point higher than a solder melting point.

6 Claims, 3 Drawing Sheets

HIGH-VOLTAGE CERAMIC CAPACITOR

TECHNICAL FIELD

The present invention relates to a high-voltage ceramic capacitor for an extra high voltage, which is used for, e.g., power signal separation, voltage division or a laser oscillation power supply.

BACKGROUND OF THE INVENTION

This type of high-voltage ceramic capacitor has a ceramic porcelain, electrodes (Ag, Cu, Ni/Sn or the like) provided on main surfaces of the ceramic porcelain, a metal terminal joined to each of the electrodes, and a resin coating closely provided on the dielectric ceramic and the electrodes over all.

In the high-voltage ceramic capacitor, the metal terminal is generally soldered to the electrode by high-temperature processing. As solder used for the soldering, solder containing metallic lead (lead solder) has been conventionally employed. Since the lead solder is very soft and superior in elasticity, this material can absorb a difference in linear expansion coefficient between the ceramic and the metal terminal and prevent a fall of the terminal and a crack of the ceramic when a high voltage is applied when soldering is performed or after soldering is finished.

However, in recent years, the solder has been shifted to lead-free solder (Pb-less solder) from which lead is removed because of environmental pollution issues. Although there are Sn/Ag/Bi/Zn and others as components of the Pb-less solder, the lead-free solder is very hard and do not have enough elasticity as compared with the lead solder. Therefore, the lead-free solder cannot absorb or alleviate a difference in thermal expansion coefficient between the respective members, resulting in a problem of a fall of the terminal or generation of a crack or a fracture in the ceramic porcelain.

Further, even in the ceramic capacitor, a reduction in superficial content of a solder joint area has been rapidly advancing due to a demand for a reduction in size, and it has been already difficult to assure the sufficient alloy junction strength at the present stage.

Various kinds of propositions have been made with respect to the Pb-less solder. For example, JP 2002-224880A (Prior Art 1) discloses Sn—Zn-based Pb-less solder containing IB-group metal powder. Furthermore, JP 2002-261105A (Prior Art 2) discloses Sn solder having Cu balls, and this solder aims at an improvement in a connection strength with respect to a mount board by coupling the Cu balls with each other through a CuSn compound.

However, both propositions solve problems that do not concern problems inherent to the high-voltage ceramic capacitor.

SUMMARY OF THE INVENTION

It is an object of the present invention to provide a high-voltage ceramic capacitor in which a fall of the metal terminal and occurrence of a crack or a fracture in the ceramic porcelain are prevented.

To achieve the above object, a high-voltage ceramic capacitor according to the present invention comprises a capacitor element, at least one metal terminal and at least one solder joint portion. Said capacitor element has electrodes on opposing surfaces of the ceramic porcelain. Said at least one metal terminal has one end surface facing one surface of the relevant electrode. Said at least one solder joint portion is interposed between said one end surface of said at least one metal terminal and said one surface of said relevant electrode and solders the both surfaces. The solder constituting said at least one solder joint portion does not contain lead but inorganic particles having a melting point higher than a solder melting point.

As described above, the high-voltage ceramic capacitor according to the present invention comprises a capacitor element, at least one metal terminal and at least one solder joint portion. The capacitor element has the electrodes on opposing surfaces of the ceramic porcelain, and the metal terminal has one end surface facing one surface of the relevant electrode. In this state, the solder joint portion is interposed between said one end surface of the metal terminal and said one surface of the relevant electrode, and solders the both surfaces. As a result, the metal terminal is surface-joined to the relevant electrode of the capacitor element by the solder joint portion.

The solder constituting the solder joint portion does not contain lead (Pb-less solder). Therefore, environmental pollution issues can be cleared. A problem lies in that the Pb-less solder is very hard and does not have enough extensibility as compared with lead solder. Therefore, there has been a problem that a difference in thermal expansion coefficient between respective members cannot be absorbed or alleviated in or after soldering when the Pb-less solder is used, thereby resulting in a fall of the terminal or occurrence of a crack or a fracture of the ceramic porcelain.

Thus, in the present invention, the solder constituting the solder joint portion contains inorganic particles having a melting point higher than a solder melting point. If the above-described inorganic particles are contained in the solder, the joining force is dispersed when shifting from a molten phase area to a solid phase area at the time of soldering, and hollow portions are partially generated. As a result, a stress generated due to a difference in linear expansion coefficient between the metal terminal and the ceramic porcelain can be alleviated, thereby solving the problem of a fall of the metal terminal or occurrence of a crack or a fracture in the ceramic porcelain.

As described above, the present invention provides a high-voltage ceramic capacitor in which a fall of the metal terminal or occurrence of a crack or a fracture in the ceramic porcelain are prevented.

Any other objects, configurations and advantages of the present invention will be described in further detail with reference to the accompanying drawings. The accompanying drawings simply show the exemplification.

DESCRIPTION OF THE PREFERRED EMBODIMENTS

Figure 1:
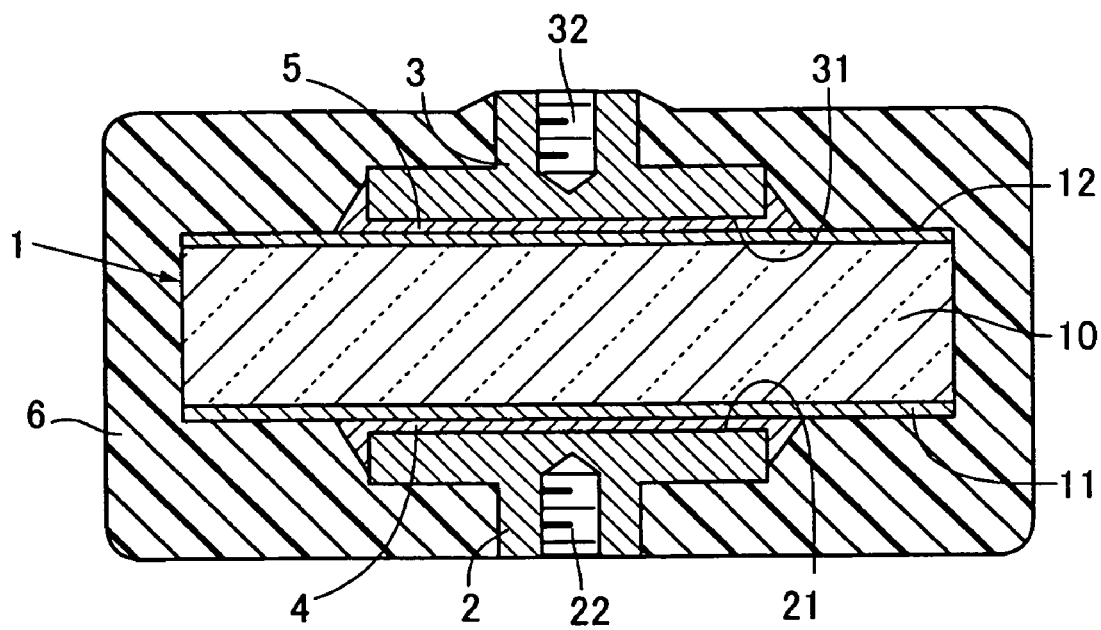
FIG. 1 is a front cross-sectional view showing an embodiment of a high-voltage ceramic capacitor according to the present invention.
Figure 2:
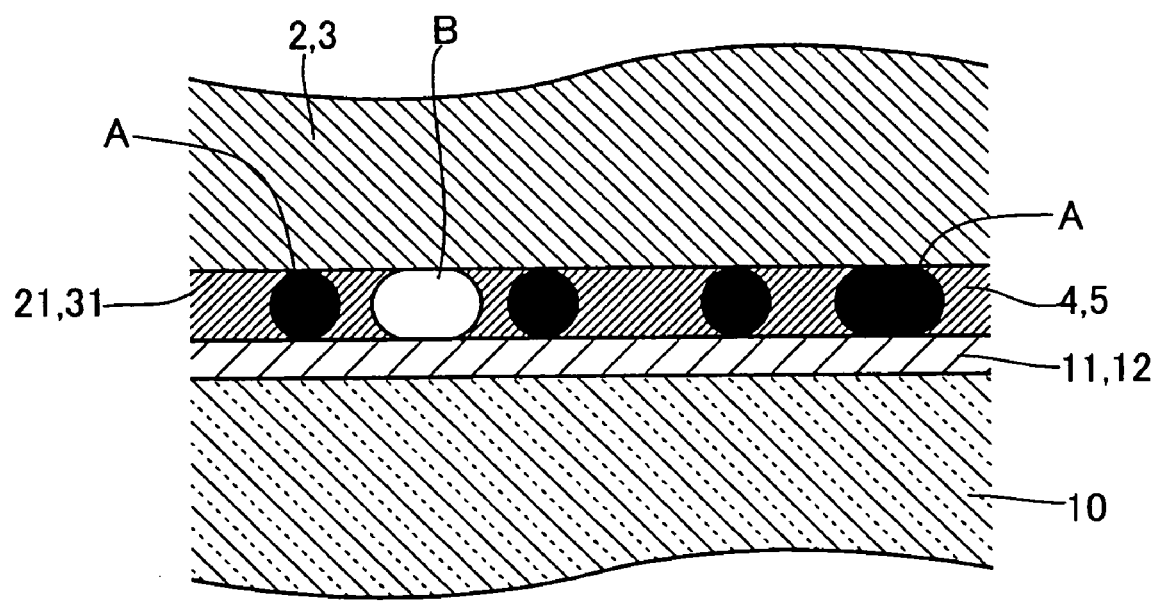
FIG. 2 is a partially enlarged cross-sectional view schematically showing the high-voltage ceramic capacitor depicted in FIG. 1.

FIG. 1 is a front cross-sectional view showing an embodiment of a high-voltage ceramic capacitor according to the present invention, and FIG. 2 is a partially enlarged cross-sectional schematically showing the high-voltage ceramic capacitor depicted in FIG. 1. The illustrated high-voltage ceramic capacitor comprises a capacitor element 1, metal terminals 2 and 3, and solder joint portions 4 and 5. The entire high-voltage ceramic capacitor is covered with a well-known insulating resin 6 such as epoxy resin.

The capacitor element 1 has electrodes 11 and 12 on opposing surfaces of the ceramic porcelain 10. The ceramic element 10 is formed of a ceramic dielectric material such as $BaTiO_3$ or $SrTiO_3$. The electrodes 11 and 12 contain Ag, Cu, Ni/Sn or the like as a main component and are secured to both main surfaces of the ceramic element 10 by means such as baking.

The metal terminal 2 (or 3) has one end surface 21 (or 31) facing one surface of the electrode 11 (or 12). The metal terminals 2 and 3 contain a material having a high electric conductivity such as Cu as a main component. In the illustrated metal terminal 2 (or 3), the portion joined to the electrode 11 (or 12) is flange-shaped with a larger diameter, and the flange-shaped portion has a protruding connection portion at the center thereof. Connection screw holes 22 and 32 are provided in the connection portions. A high voltage of, e.g., approximately 5 to 50 kV is applied between the metal terminals 2 and 3.

The solder joint portion 4 (or 5) is interposed between one end surface 21 (or 31) of the metal terminal 2 (or 3) and one surface of the electrode 11 (or 12), and solders the both surfaces. The solder constituting the solder joint portions 4 and 5 does not contain lead but inorganic particles A (see FIG. 2) having a melting point higher than a solder melting point.

As described above, the high-voltage ceramic capacitor according to the present invention comprises the capacitor element 1, the metal terminals 2 and 3, and the solder joint portions 4 and 5. The capacitor element 1 has the electrodes 11 and 12 on opposing surfaces of the ceramic porcelain 10, and the metal terminal 2 (or 3) has one end surface 21 (or 31) facing one surface of the electrode 11 (or 12). In this state, the solder joint portion 4 (or 5) is interposed between one end surface 21 (or 31) of the metal terminal 2 (or 3) and one surface of the electrode 11 (or 12), and solders the both surfaces. As a result, the metal terminal 2 (or 3) is surface-joined to the electrode 11 (or 12) of the capacitor element 1 by the solder joint portion 4 (or 5).

The solder constituting the solder joint portions 4 and 5 does not contain lead (Pb-less solder). Specifically, Sn/Ag/Bi/Cu-based solder, Sn/Zn-based solder or the like can be used. Therefore, environmental pollution issues can be cleared. A problem lies in that the Pb-less solder is very hard and does not have enough extensibility as compared with the lead solder. Accordingly, there has been a problem in which a difference in thermal expansion coefficient between respective members cannot be absorbed or alleviated in or after soldering when the Pb-less solder is used, thereby resulting in a fall of the metal terminals 2 and 3 or occurrence of a crack or a fracture in the ceramic porcelain 10, as described above.

Thus, in the present invention, inorganic particles A having a melting point higher than a solder melting point are contained in the solder constituting the solder joint portions 4 and 5. Specifically, the above-described inorganic particles A are contained in, e.g., Sn/Ag/Bi/Cu-based or Sn/Zn-based solder. The inorganic particles A don't not dissolve in the solder and the inorganic particles maintain an independent form even if any kind of inorganic particle material is selected.

If the inorganic particles A are contained in the above-described solder main component, a joining force is dispersed when shifting from a molten phase area to a solid phase area at the time of soldering, and hollow portions B (see FIG. 2) are partially generated. As a result, a stress produced due to a difference in linear expansion coefficient between the metal terminals 2 and 3 and the ceramic porcelain 10 can be alleviated, thereby eliminating the problem of a fall of the metal terminals 2 and 3 or occurrence of a crack or a fracture in the ceramic porcelain 10. In the process of soldering the electrodes 11 and 12 with the metal terminals 2 and 3, cream solder containing the inorganic particles is applied on the surfaces of the electrodes 11 and 12 and the metal terminals 2 and 3 are pressed against these surfaces, or the same cream solder is applied on the surfaces 21 and 31 of the metal terminals 2 and 3 and the electrodes 11 and 12 are pressed against these surfaces. After that, a solder thermal treatment is performed in this state.

Although using ceramic particles or the like is possible under considered conditions of the particle content and other factors, it is preferable that the inorganic particles A are metal particles. That is because desirable physical characteristics such as the electrical conductivity, the wettability with respect to a solder main component, the similarity of the linear expansion coefficient or the like can be utilized if the inorganic particles A are metal particles. Specifically, the metal particles can contain at least one type selected from a group of Cu, Ag Bi and Zn or an alloy of these substances. All these materials have the above-described desirable physical characteristics.

Moreover, it is preferable that the inorganic particles A have a substantially spherical shape. If the inorganic particles A have a spherical shape, a layer thickness of each of the solder joint portions 4 and 5 can be fixed by using the inorganic particles A having a uniform particle diameter.

It is preferable that the inorganic particles A are in the range of 15 to 150 μm in particle diameter. If the particle diameter falls within such a range, a desirable joint thickness which is required for the solder joint portions 4 and 5 can be assuredly set as a thickness which is in proportion to a particle diameter of the inorganic particle A.

Additionally, it is preferable that the inorganic particle content of the solder is in the range of 0.5 to 20 wt %. The technical significance of adding the inorganic particles A is lost if this content is less than 0.5 wt %, and the soldering strength becomes insufficient if this content exceeds 20 wt %.

Figure 3:
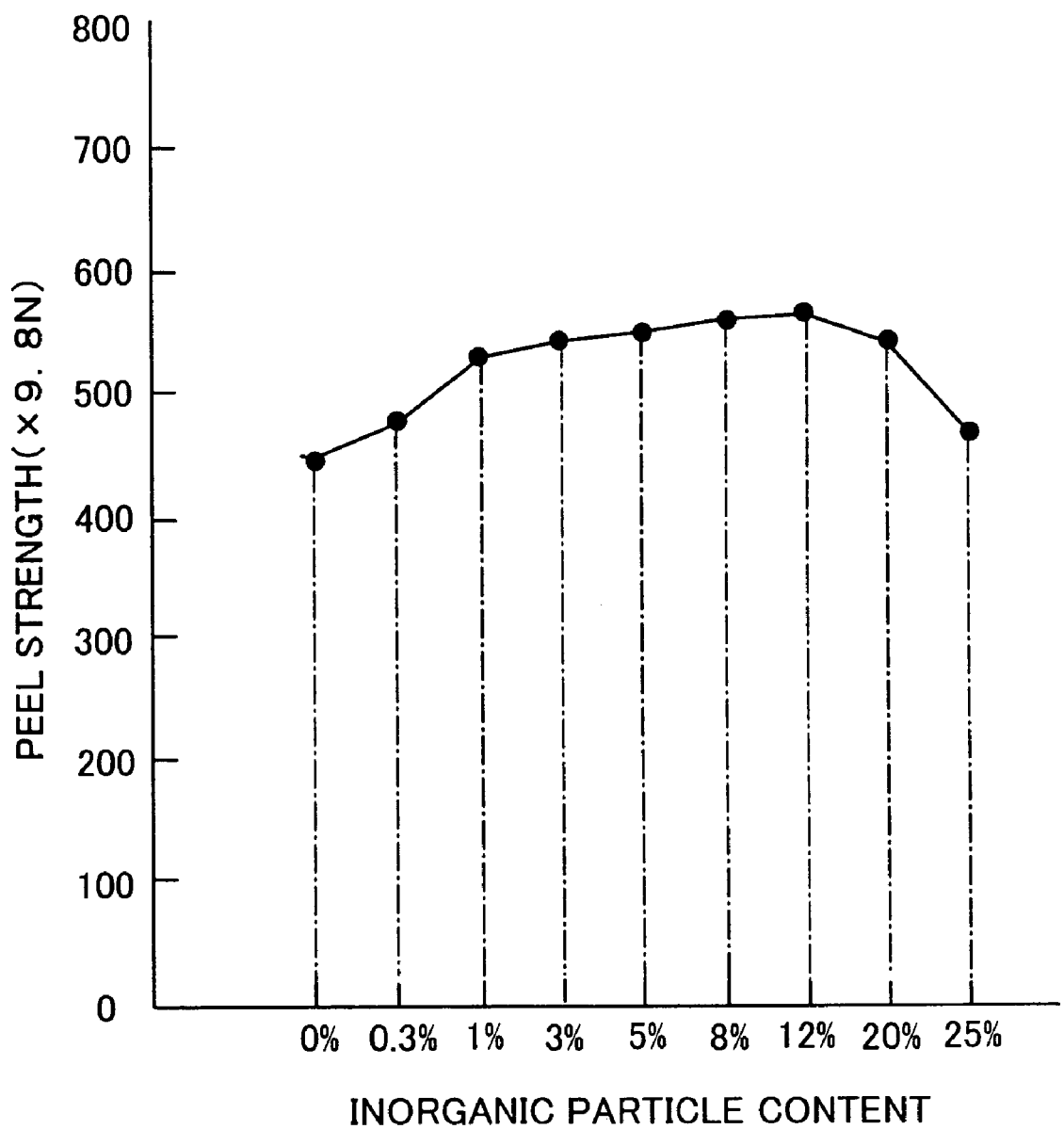
FIG. 3 shows a relationship between the inorganic particle content of the solder joint portion and the peel strength of the metal terminal.

FIG. 3 shows data representing the inorganic particle content of the solder and the peel strength of the metal terminals 2, 3 in the high-voltage ceramic capacitor depicted in FIGS. 1 and 2. In the drawing, the horizontal axis represents the inorganic particle content, and the vertical axis represents the peel strength. As the inorganic particles, Cu metal particles in the range of 15 to 150 μm in particle diameter were used. A unit N of the peel strength means Newton. The data depicted in FIG. 3 shows the average peel strength in each inorganic particle content. In each inorganic particle content, 12 samples were prepared and the peel strengths of the 12 samples were measured to calculate the average peel strength.

Referring to FIG. 3, the peel strength is suddenly reduced in the area where the inorganic particle content (Cu metal particle content) is less than 0.3 wt %, with a 0.3 wt % being determined as a boundary. The peel strength increases when the inorganic particle content exceeds 0.3 wt %, and the high peel strength is demonstrated when the inorganic particle content is from 1 wt % to 20 wt %, but the peel strength is suddenly reduced when the inorganic particle content exceeds 20 wt %. It can be understood from these data that it is preferable that the inorganic particle content (Cu metal particle content) is in the range of 0.5 to 20 wt %, especially 1 to 20 wt %. The similar result was obtained when Ag, Bi or Zn was used as the inorganic particles.

Table 1 shows a relationship between the inorganic particle content and the number of ceramic porcelain crack. Table 1 shows the number of cracks occurring in 12 samples, which were prepared in each inorganic particle content (Cu metal particle content).

TABLE 1

| Inorganic particle content (wt %) | 0 | 0.3 | 1.0 | 3.0 | 5.0 | 8.0 | 12.0 | 20.0 | 25.0 |
|---|---|---|---|---|---|---|---|---|---|
| The number of cracks | 3/12 | 1/12 | 0/12 | 0/12 | 0/12 | 0/12 | 0/12 | 0/12 | 0/12 |

Referring to Table 1, cracks are produced when the inorganic particle content is 0.3 wt % or less, whereas no crack is generated when the inorganic particle content is more than 0.3 wt %. Therefore, in view of prevention of cracks, it is desirable that the inorganic particle content is at a value more than 0.3 wt %, specifically, a value of 0.5 wt % or more while taking the safety into consideration.

Figure 4:
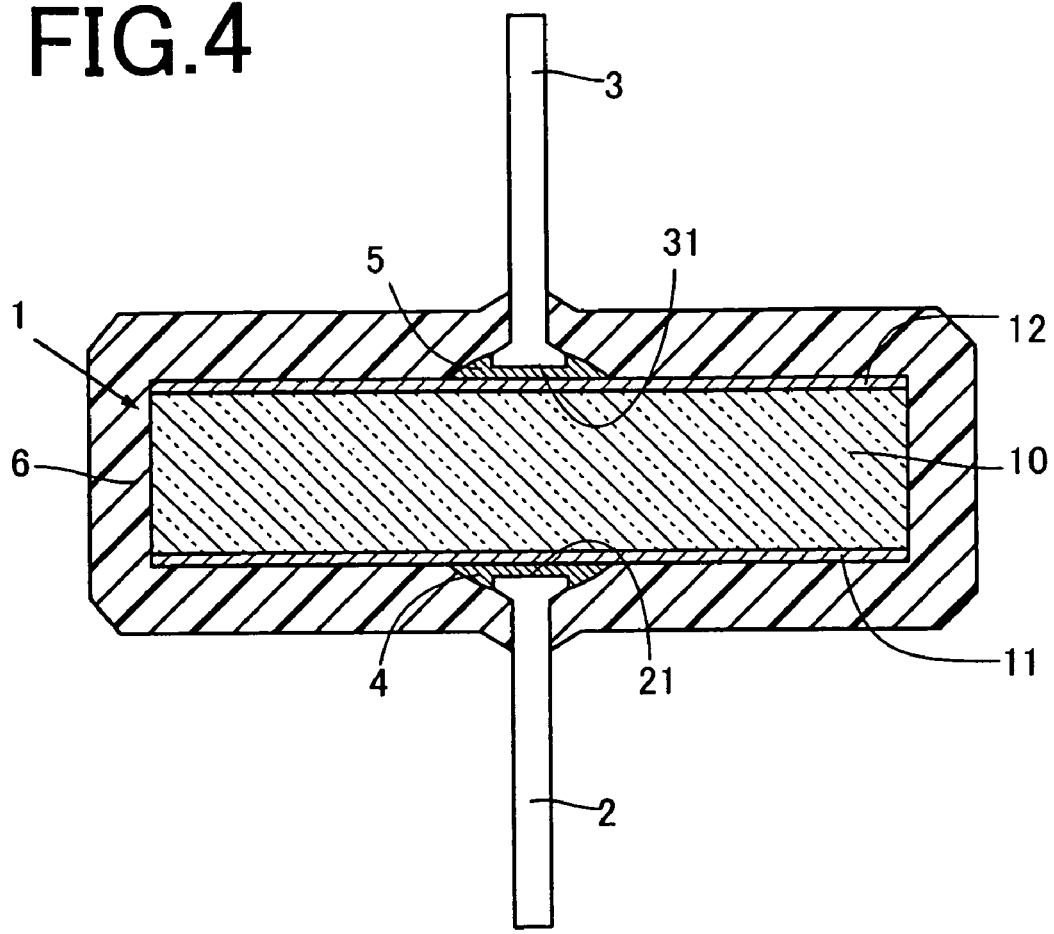
FIG. 4 is a front cross-sectional view showing another embodiment of the high-voltage ceramic capacitor according to the present invention.

FIG. 4 is a cross-sectional view showing another embodiment of the high-voltage ceramic capacitor according to the present invention. In the drawing, like reference numerals denote parts corresponding to the constituent parts shown in FIGS. 1 and 2. In this embodiment, each of the metal terminals 2 and 3 is formed of a line-shaped member which thinner than that shown in FIGS. 1 and 2. One end portion of the metal terminal 2 (or 3) has a bulging shape, and the end surface 21 (or 31) in the end portion is joined to the electrode 11 (or 12) by the solder joint portion 4 (or 5).

Figure 5:
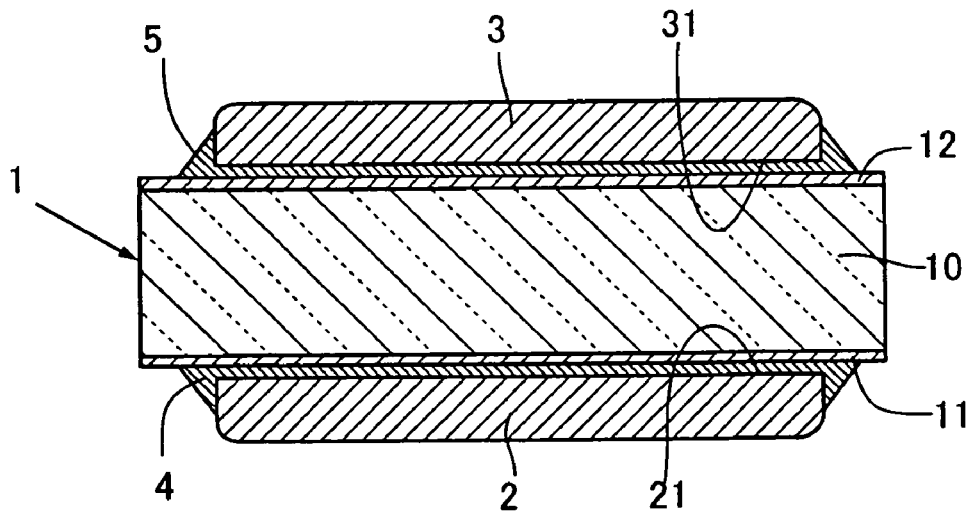
FIG. 5 is a front cross-sectional view showing still another embodiment of the high-voltage ceramic capacitor according to the present invention.

FIG. 5 is a cross-sectional view showing still another embodiment of the high-voltage ceramic capacitor according to the present invention. In the drawing, like reference numerals denote parts corresponding to the constituent parts shown in FIGS. 1 and 2. This embodiment shows a so-called bare type high-voltage ceramic capacitor, and each of the metal terminals 2 and 3 is formed of a flat plate member. The entire surface 21 (or 31) of the metal terminal 2 (or 3) is joined to the electrode 11 (or 12) by the solder joint portion 4 (or 5).

In the embodiments shown in FIGS. 4 and 5, the solder joint portions 4 and 5 likewise contain the above-described inorganic particles, and the same effects and advantages as those of the embodiments depicted in FIGS. 1 and 2 are demonstrated.

Although the above has specifically described the content of the present invention with reference to the preferred embodiments, it is self-evident that persons skilled in the art can adopt various kinds of modifications based on the basic technical concepts and teachings of the present invention.

What is claimed is:

1. A high-voltage ceramic capacitor comprising a capacitor element, at least one metal terminal and at least one solder joint portion, wherein:
    said capacitor element has electrodes on opposing surfaces of a ceramic porcelain;
    said at least one metal terminal has one end surface facing one surface of the relevant electrode;
    said at least one solder joint portion is interposed between said one end surface of said at least one metal terminal and said one surface of said relevant electrode and solders the both surfaces; and
    the solder constituting said at least one solder joint portion does not contain lead but inorganic particles having a melting point higher than a solder melting point.

2. The high-voltage ceramic capacitor of claim 1, wherein:
    said inorganic particles are metal particles.

3. The high-voltage ceramic capacitor of claim 2, wherein:
    said metal particles contain at least one type selected from a group of Cu, Ag, Bi and Zn or an alloy of these substances.

4. The high-voltage ceramic capacitor of claim 1, wherein:
    said inorganic particles have a substantially spherical shape.

5. The high-voltage ceramic capacitor of claim 1, wherein:
    said inorganic particles are in the range of 15 to 150 μm in particle diameter.

6. The high-voltage ceramic capacitor of claim 1, wherein:
    the inorganic particle content of said solder is in the range of 0.5 to 20 wt %.

* * * * *